(12) United States Patent
Schnittger et al.

(10) Patent No.: US 8,864,245 B2
(45) Date of Patent: Oct. 21, 2014

(54) VALVE DEVICE, ELECTRICALLY OPERABLE PARKING BRAKE SYSTEM AND METHOD FOR CONTROLLING AN ELECTRICALLY OPERABLE PARKING BRAKE SYSTEM

(75) Inventors: Karsten Schnittger, Munich (DE); Oliver Kaupert, Munich (DE); Mustafa Uslu, Munich (DE)

(73) Assignee: KNORR-BREMSE Systeme fuer Nutzfaurzeuge GmbH, Munich (DE)

( * ) Notice: Subject to any disclaimer, the term of this patent is extended or adjusted under 35 U.S.C. 154(b) by 619 days.

(21) Appl. No.: 12/957,713

(22) Filed: Dec. 1, 2010

(65) Prior Publication Data

US 2011/0147141 A1    Jun. 23, 2011

(30) Foreign Application Priority Data

Dec. 21, 2009  (DE) .......................... 10 2009 059 900

(51) Int. Cl.
| | |
|---|---|
| *B60T 8/34* | (2006.01) |
| *B60T 15/18* | (2006.01) |
| *B60T 13/68* | (2006.01) |
| *B60T 13/66* | (2006.01) |
| *F16K 11/044* | (2006.01) |

(52) U.S. Cl.
CPC .............. *B60T 13/683* (2013.01); *B60T 15/18* (2013.01); *B60T 13/662* (2013.01); *F16K 11/044* (2013.01)
USPC .. 303/118.1; 303/3; 137/625.66; 137/625.25; 137/625.68

(58) Field of Classification Search
CPC .... B60T 13/662; B60T 16/683; F16K 11/044
USPC ............ 303/3, 7, 8, 15, 84.1, 84.2, 118.1, 40, 303/123; 137/625.66, 625.27, 625.28, 137/625.25, 625, 25, 625.68
See application file for complete search history.

(56) References Cited

U.S. PATENT DOCUMENTS

| | | | | | |
|---|---|---|---|---|---|
| 3,921,660 | A | * | 11/1975 | Kowalski | 137/236.1 |
| 4,261,624 | A | * | 4/1981 | Plantan | 303/7 |
| 4,598,953 | A | * | 7/1986 | Wood et al. | 303/3 |
| 4,660,894 | A | * | 4/1987 | Bartholomew et al. | 303/54 |
| 4,786,116 | A | * | 11/1988 | Schulz | 303/40 |
| 5,458,403 | A | * | 10/1995 | Moody | 303/7 |
| 5,466,053 | A | * | 11/1995 | Koelzer | 303/7 |
| 5,620,027 | A | * | 4/1997 | Sato | 137/625.66 |
| 5,971,498 | A | * | 10/1999 | Engle | 303/3 |

(Continued)

FOREIGN PATENT DOCUMENTS

| | | |
|---|---|---|
| DE | 10 2007 051 150 | 11/2008 |
| DE | 10 2007 061 908 | 6/2009 |

(Continued)

OTHER PUBLICATIONS

German Office Action dated Jun. 7, 2010 with English translation (six (6) pages).

*Primary Examiner* — Robert A Siconolfi
*Assistant Examiner* — Charles Poon
(74) *Attorney, Agent, or Firm* — Crowell & Moring LLP

(57) ABSTRACT

A valve device is provided for a pneumatic brake system of a commercial vehicle and comprises a pilot piston, radial seals and at least one valve seat, which can be displaced in the direction of motion of the pilot piston.

10 Claims, 11 Drawing Sheets

(56) References Cited

U.S. PATENT DOCUMENTS

| | | | |
|---|---|---|---|
| 6,079,790 A * | 6/2000 | Broome | 303/3 |
| 6,270,168 B1 * | 8/2001 | McCann | 303/77 |
| 6,286,912 B1 * | 9/2001 | Sturgess | 303/7 |
| 6,926,372 B2 * | 8/2005 | Bigo et al. | 303/15 |
| 7,494,194 B2 * | 2/2009 | Higgs et al. | 303/15 |
| 2002/0069920 A1 * | 6/2002 | Reinelt et al. | 137/625.66 |
| 2004/0119332 A1 * | 6/2004 | Marsh et al. | 303/40 |
| 2004/0183362 A1 * | 9/2004 | Root | 303/7 |
| 2006/0006733 A1 * | 1/2006 | Geiger et al. | 303/3 |
| 2007/0023092 A1 * | 2/2007 | Yamamoto et al. | 137/625.27 |
| 2007/0164602 A1 * | 7/2007 | Haffelder et al. | 303/3 |
| 2008/0258542 A1 * | 10/2008 | Soupal | 303/7 |

FOREIGN PATENT DOCUMENTS

| | | | | |
|---|---|---|---|---|
| DE | 10 2008 007 877 B3 | 11/2009 | | |
| EP | 394065 A2 * | 10/1990 | | B60T 13/26 |
| EP | 422345 A1 * | 4/1991 | | B60T 15/20 |
| JP | 59202969 A * | 11/1984 | | B60T 15/36 |
| WO | WO 9108934 A1 * | 6/1991 | | B60T 8/36 |

* cited by examiner

VALVE DEVICE, ELECTRICALLY OPERABLE PARKING BRAKE SYSTEM AND METHOD FOR CONTROLLING AN ELECTRICALLY OPERABLE PARKING BRAKE SYSTEM

CROSS-REFERENCE TO RELATED APPLICATION

This application claims priority under 35 U.S.C. §119 to German Patent Application No. DE 10 2009 059 900.2, filed Dec. 21, 2009, the entire disclosure of which is herein expressly incorporated by reference.

BACKGROUND AND SUMMARY OF THE INVENTION

The invention relates to a valve device that is intended for a pneumatic brake system of a commercial vehicle and that comprises a valve housing, a pilot piston, which is guided in an axially displaceable manner in the valve housing by way of radial seals, a first working port, a second working port, a pneumatic control input, and an air bleed port.

In a first switched state of the valve device the control input is pressurized, wherein the pilot piston is held in a first end position, sealing a first valve seat, against a spring force, so that the first valve seat seals the second working port against the air bleed port, and further wherein the pilot piston is lifted from a second valve seat, so that the first working port is connected to the second working port.

In a second switched state of the valve device the control input is bled, wherein the pilot piston is lifted from the first valve seat by a spring force, so that the first valve seat connects the second working port to the air bleed port, and further wherein the pilot piston is held in a second end position, sealing the second valve seat, with the spring force, so that the second valve seat seals the first working port against the second working port.

Furthermore, the invention relates to an electrically operable parking brake system that is intended for a pneumatic brake system and that has, as the pilot valve device, a valve device of the above-mentioned type.

The invention also relates to a method for controlling an electrically operable parking brake system, in particular for moving the electrically operable parking brake system from a drive mode into a park mode.

In electrically operable parking brake systems, as described, for example, in DE 10 2008 007 877 B3, a central safety-relevant requirement is that a power failure may not result in a state change of the parking brakes. If the parking brake is in its park mode, then even in the event of a power failure it is necessary to maintain the park mode, in order to prevent in this way the commercial vehicle from unintentionally rolling away in any case. If the parking brake is in a drive mode, then the parking brake may not be abruptly engaged when the power fails, because such a sudden engagement can lead to hazardous situations when the vehicle is in motion.

In order to satisfy these safety-relevant requirements, it is possible to use bistable pilot valves, which can be driven either electrically or pneumatically. The present invention deals with pneumatically driven switching valve devices, which are integrated into an electrically operable parking brake system such that the result is a bistability, which in turn meets the aforementioned safety-relevant requirements.

Electrically operable parking brake systems and, in particular, the aforementioned pneumatic pilot valve devices are configured in such a way that absolute switching reliability is guaranteed. If, therefore, the pressure conditions in the parking brake system are changed in order to cause a changeover of the pilot valve device, then the pilot valve device has to be able to switch reliably—even under any external conditions, in particular, even at low temperature, which can prevent a changeover of the switching valve device especially due to higher friction forces.

There is therefore needed a concept that guarantees the bistability of a pneumatic pilot valve device for an electrically operable parking brake system, so that the result is absolute switching reliability even at low temperatures. In meeting this need, the invention shall offer, in particular, solutions that are characterized by minimum abrasive wear of the system components and, in particular, of the pneumatic pilot valve device.

According to the invention, a valve device is provided that is intended for a pneumatic brake system of a commercial vehicle and that comprises a valve housing, a pilot piston, which is guided in an axially displaceable manner in the valve housing by way of radial seals, a first working port, a second working port, a pneumatic control input, and an air bleed port. In a first switched state of the valve device the control input is pressurized, wherein the pilot piston is held in a first end position, sealing a first valve seat, against a spring force, so that the first valve seat seals the second working port against the air bleed port, and further wherein the pilot piston is lifted from a second valve seat, so that the first working port is connected to the second working port. In a second switched state of the valve device the control input is bled, wherein the pilot piston is lifted from the first valve seat by a spring force, so that the first valve seat connects the second working port to the air bleed port, and further wherein the pilot piston is held in a second end position, sealing the second valve seat, with the spring force, so that the second valve seat seals the first working port against the second working port. The first valve seat is displaceable in the direction of movement of the pilot program.

If the pilot piston is sitting on the first valve seat, then the parking brake system is in a drive mode. In order to attain a park mode from this drive mode, the pilot piston has to be lifted from the valve seat and displaced in the valve housing for this purpose. Such a displacement counteracts, in particular, two effects—that is, both the adhesion of the pilot piston to the valve seat and a high static friction of the radial seals, which can be implemented, for example, as O-rings, guiding the pilot piston in the valve housing. Since the valve seat can be displaced in the direction of motion of the pilot piston in accordance with the invention, it is then possible to separate these two effects. That is, when the pilot piston begins to move initially, only the static friction of the radial seals has to be overcome, because the valve seat follows the pilot piston during the initial movement. Only after the radial seals are barely able to generate a sliding friction that is lower by an order of magnitude does the pilot piston have to be lifted from the valve seat against the adhesion forces.

Working on this basis, it can be provided in a useful way that the first valve seat is loaded with a spring force so that, when the pilot piston leaves its first end position, the first valve seat follows the movement of the pilot piston. This spring force facilitates the initial movement of the pilot piston that is adversely affected by the static friction of the radial seals. If vice versa the pilot valve device is to be moved from its park mode into the drive mode, then the only requirement is that the pilot piston be moved against the spring that is assigned directly to the pilot piston, so that then a comparably low spring force has an effect, if, starting from the park mode, only the high static friction of the radial seals is present. If the pilot piston sits on the first valve seat, then thereafter as the pilot piston continues to move, the spring force, assigned to the first valve seat, also has an effect. However, the resulting higher spring force will not impede the further movement of the pilot piston, because as this pilot piston continues to move, just the sliding friction forces of the radial seals continue to have an effect.

In order to guarantee that the pilot piston will be lifted in a reliable and defined manner from the first valve seat, the invention advantageously provides that the displaceability of the first valve seat is limited such that the first valve seat cannot follow the pilot piston as far as to its second end position. This feature is implemented preferably by a stop that precludes the further movement of the movable valve seat.

The invention is further developed in an especially advantageous way in that an active surface that is part of a valve seat piston bearing the first valve seat and that faces away from the first valve seat is arranged in an air bleed space that is located at the pressure level of the air bleed port in at least the first switched state of the valve device. An active surface of this type is defined as a surface that is defined by more than just bevels or edge regions of the valve seat piston. In particular, the active surface can be formed by the whole or almost the whole surface of the valve seat piston that faces away from the valve seat. Thus, by pressurizing the air bleed port a force is generated that acts in this direction like the spring force, so that in this way the movement of the pilot piston against the static friction of the radial seals is facilitated once again. Since this feature is implemented preferably in such a way that in the drive mode the valve seat piston with its active surface, facing away from the valve seat, is not supported directly on the housing, but indirectly on the housing by way of the spring, it is then possible to adjust the sealing force, acting on the first valve seat, by means of the spring force. This force has to be so large that the first valve seat is sealed with a high degree of certainty, but the force may be set so low that the adhesion of the pilot piston is less than in the case of solutions with a stationary valve seat, and, moreover, owing to the reduced valve seat forces, the abrasive wear of the valve seat, made of an elastomer, is slowed down.

Furthermore, the invention provides an electrically operable parking brake system that is intended for a pneumatic brake system and that has a pilot valve device of the aforementioned type, wherein the first working port can be supplied selectively with compressed air from a compressed air source or can be bled, the second working port can be coupled with a compressed air consumer, the pneumatic control input is coupled at least indirectly with the control input of a relay valve for the parking brake, and the air bleed port is coupled with a pilot and air bleed valve device.

The advantages of such an electrically operable parking brake system have already been discussed above in conjunction with the pilot valve device.

The present invention also relates to a method for moving such an electrically operable parking brake system from a drive mode into a park mode, wherein the air bleed port is pressurized by the pilot and air bleed valve device, while the control input is bled.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
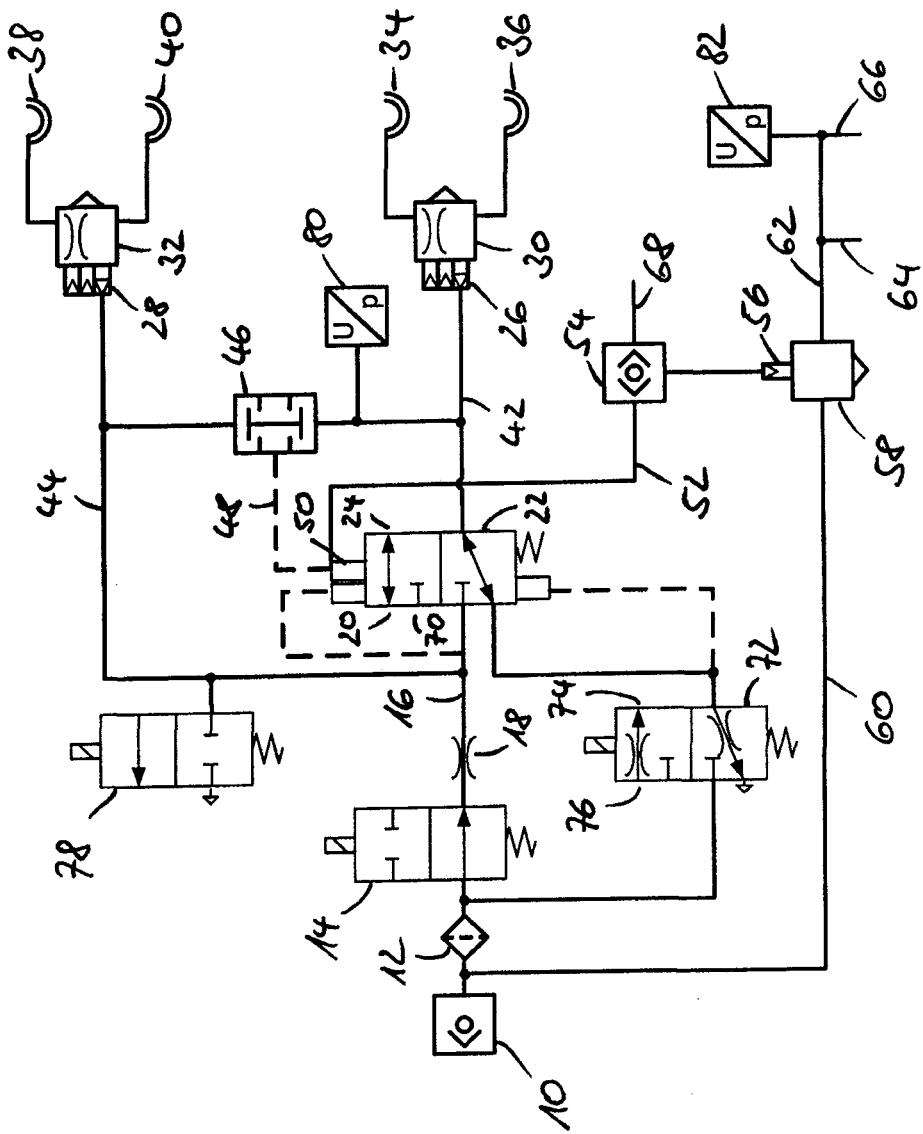
FIG. 1 is a circuit diagram of an electrically operable parking brake system.

In the following description of the circuit diagrams and the sectional views of valve devices the same reference numerals identify the same or comparable components. The circuits include, as the central devices, 3/2 way valves. They can be replaced with two 2/2 way valves, where the principles that are explained by means of the 3/2 way valves are then transferred to the 2/2 way valve groups in accordance with the present invention.

FIG. 1 shows a circuit diagram of an electrically operable parking brake system. The electrically operable parking brake system is connected to a compressed air system (not illustrated) by way of a check valve 10. Downstream of the check valve 10 is an optional filter unit 12, by way of which the compressed air is conveyed to a supply solenoid valve 14, which is configured as a 2/2 way valve. A working port 20 of a pilot valve device 22 is connected to the output of the supply solenoid valve 14 by way of a supply line section 16 and an optional throttle 18.

The pilot valve device 22 is configured as a pneumatically driven 3/2 way valve. A second working port 24 of the pilot valve device 22 leads to a control input 26 of a trailer control module 30. This module uses a supply port 34 and a pilot port 36 of the trailer coupling. A control input 28 of an additional trailer control module 32 is connected to the supply line branch 16 by way of a trailer control line branch 44. It has a supply port 38 and a pilot port 40. The trailer control line branches 42, 44 are connected to the inputs of a select low valve 46, of which the output is connected to a control input 50 of the pilot valve device 22 by way of a control line 48. The select low valve works in such a way that the lower input pressure—that is, the lower power from the two trailer control line branches 42, 44—is applied to the output of the select low valve—that is, in the control line 48. Furthermore, the control line 48 is connected to the relay control input 56 of a relay valve 58 by way of a relay control line 52 and a shuttle valve 54. The relay valve 58 draws via a relay supply line 60, compressed air from a point upstream of the supply solenoid valve 14. A relay output line leads to the line branches 64, 66, to which the spring accumulator cylinders are connected, which are not illustrated. Furthermore, a service brake line 68 is connected to the shuttle valve 54. Connected to an air bleed port 70 of the pilot valve device 22 is a port 74 of a pilot and air bleed valve device 72. An additional port 76 of the pilot and air bleed valve device 72 is supplied with compressed air from a point between the filter unit 12 and the supply solenoid valve 14. Furthermore, there is an air bleed valve 78, which is configured as a 2/2 way valve and which is connected to the supply line section 16. Furthermore, there are pressure sensors 80, 82 for measuring the pressure conditions at the second working port 24 of the pilot valve device 22 and the relay output line 62.

In the switched state shown in FIG. 1, the second working output of the pilot valve device 22 is bled by means of the pilot and air bleed valve device 72, so that in the absence of a pressure load via the service brake line 68 the control input 56 of the relay valve 58 is also bled. Consequently, the spring accumulator cylinders (not illustrated) are without pressure, so that the parking brake is in its park position. In order to move the parking brake into a drive position, the pilot and air bleed valve device 72 is now switched over. Consequently, pressure builds up especially in the control line branch 48, the relay control line 52 and at the relay control input 56. On exceeding a threshold value, this pressure results in the relay valve 58 being connected, so that the spring accumulator cylinders are pressurized and the parking brake is released.

Similarly, the pressure in the control line 48 is the driving force for changing over the pilot valve 22. Depending on the switching strategy, this changeover can be carried out before the pilot and air bleed device 72 is moved again into its illustrated de-energized state. Should a changeover take place, while the pilot and air bleed valve device 72 is still in its energized state, then the pilot valve device 22 should be provided with such active surfaces that the pressure, applied to the ports, generates forces that overcome the spring force of the pilot valve device 22. The switching strategy, which allows a changeover of the pilot valve device 22 against the spring force after a changeover of the pilot and air bleed valve device 72 into its de-energized state, is based on dynamic sequences that will be explained below. If, therefore, the goal was reached, irrespective of the method, that the pilot valve device 22 has changed over, then the pressure at the control inputs 50 and 56 of the pilot valve device 22 and the relay valve 58 can continue to build up, because at this point the corresponding line branches are supplied with compressed air from the supply line section 16. In particular, the pilot valve device 22 stays in its state in the absence of additional switching processes of the solenoid valves 14, 72, 78. A power failure has no impact on this state, so that it is impossible to inadvertently move the parking brake system into its park mode. In contrast, such a changeover occurs according to plan because the air bleed solenoid valve 78 is energized, so that the pressure in the supply line section and thus also at the control inputs 50, 56 of the pilot valve device 22 and the relay valve 56 decreases. The result is a changeover of the pilot valve device 22 into its illustrated position and results in a subsequent total air bleeding of the control inputs 50, 56 of the pilot valve device 22 and the relay valve 58. The resulting park position is ensured by the spring action in the pilot valve device 22, so that once again a power failure cannot lead to an unintentional switch-over from the park mode into the drive mode.

An additional switched state of the system exists when the air bleed valve 78, the supply solenoid valve 14 and the pilot and air bleed valve device 72 are energized, so that the control input 50 of the pilot valve device 22 and the control input 56 of the relay valve are bled, but the control input 26 of the trailer pilot valve 30 is pressurized. These pressure conditions in the system cause the trailer brake to be released, while the parking brake of the pulling vehicle is or remains engaged. Thus, there is a trailer test state, in which it can be checked whether the entire train consisting of the pulling vehicle and trailer can be held by the parking brake of the pulling vehicle.

Figure 2:
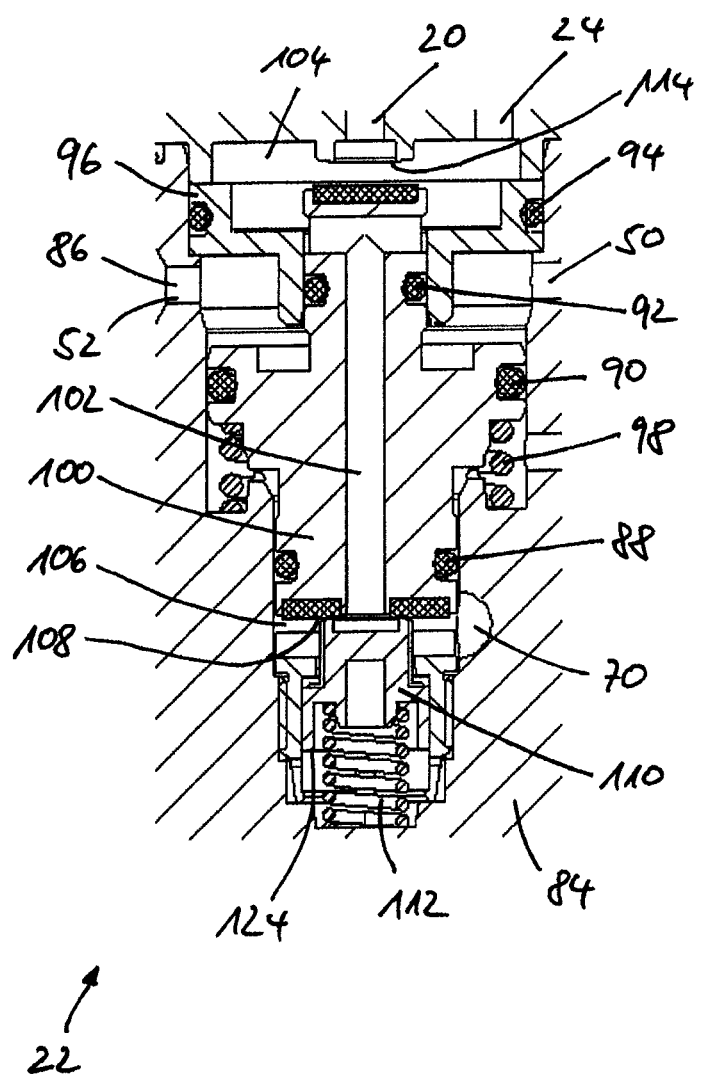
FIG. 2 is a pilot valve device with a displaceable valve seat in a drive position.

FIG. 2 shows a pilot valve device 22 with a displaceable valve seat 108 in a drive position. A valve housing 84 houses the pilot valve device 22, which has a first working port 20, a second working port 24, a control input 50 and an air bleed port 70. Furthermore, there is a relay port 86, which is connected to the relay control line 52 and at which the same pressure prevails as at the control input 50. The pilot valve device 22 has a pilot piston 100, which is guided via three O-rings 88, 90, 92, which act as the radial seals, in the valve housing 84 or rather via a sleeve 96, which is inserted sealingly in the valve housing 84 by means of an O-ring 94. There is a spring 98, which applies force to the pilot piston 100. The pilot piston 100 has a central borehole 102, by which a working space 104 can communicate with an air bleed space 106. In the illustrated state of the pilot valve device 22, however, this communication is suppressed by the first valve seat 108, which has a sealing effect. The first valve seat 108 is made effective by the interaction of the pilot piston 100 with the valve seat piston 110, as a result of which the valve seat piston 110 is supported on the valve housing 84 by way of a spring 112.

Then the switched state of the pilot valve device 22 that is shown in FIG. 2 is present, if compressed air is supplied by way of the working port 20 and the control input 50, while the air bleed port 70 is bled.

Figure 3:
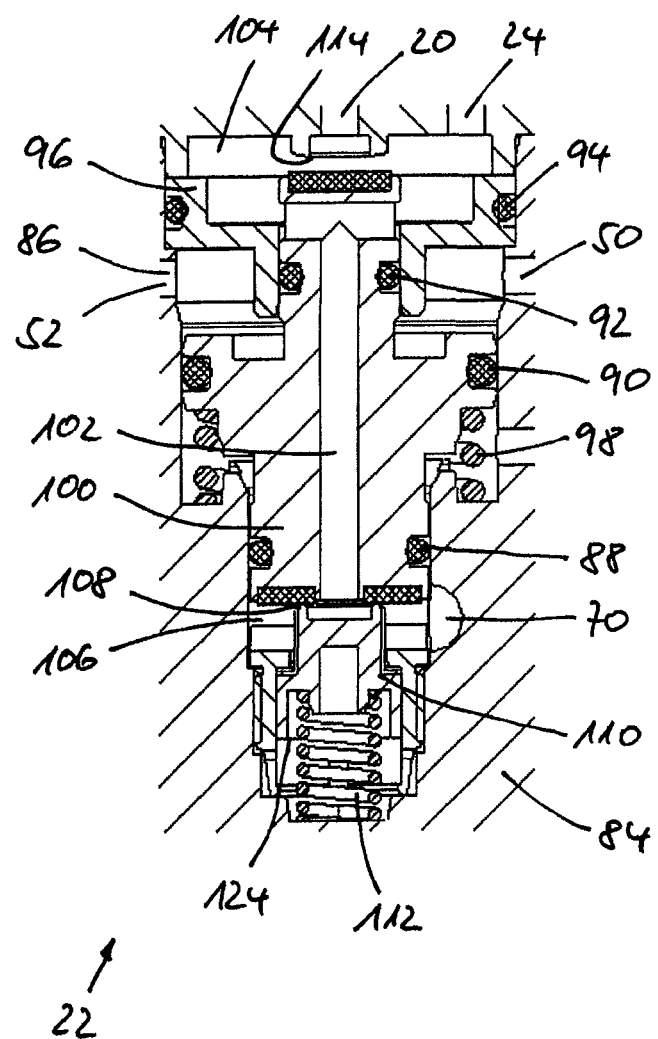
FIG. 3 is a pilot valve device with a displaceable valve seat in an intermediate position.
Figure 4:
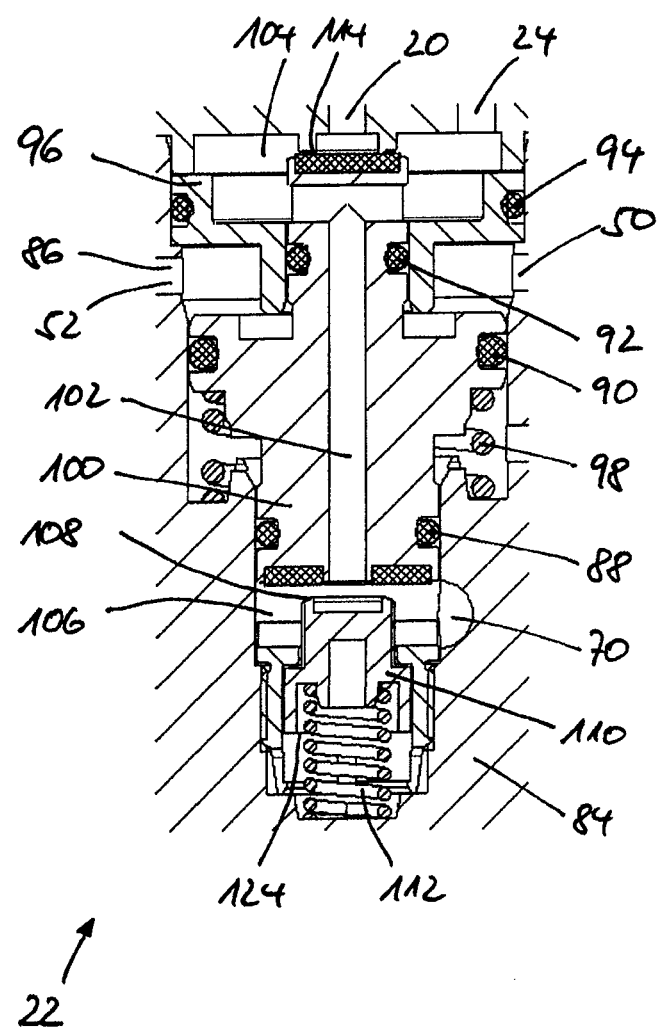
FIG. 4 is a pilot valve device with a displaceable valve seat in a park position.

FIG. 3 shows the pilot valve device 22 with a displaceable valve seat 108 in an intermediate position. FIG. 4 shows the pilot valve device 22 with a displaceable valve seat 108 in a park position. If the pilot valve device 22 is to be moved from the switched state—the drive mode—shown in FIG. 2 into the switched position—the park mode—shown in FIG. 4, then the working port 20 is bled. As a result, the springs 98, 112 can move the pilot piston 100 against the decreasing pressure in the working space.

In so doing, the displaceable valve seat piston 110 follows the pilot piston 100. The resulting intermediate state is shown in FIG. 3. The pilot piston 100 has already moved in a direction, which reduces the working space 104, but the valve seat 108 seals, now as before, the working space 104 against the air bleed space 106. Consequently, up until this point-in-time there was no need to overcome a potential adhesion of the pilot piston 100 to the valve seat 108. Only the static friction force of the O-rings 88, 90, 92 acted up to this moment against the movement of the pilot piston 100. Not until the subsequent switch-over into the switched state shown in FIG. 4 do the eventual adhesion forces of the valve seat 108 have to be overcome, while at the same time only the sliding friction of the O-rings 88, 90, 92 still has an effect. Thus, the opening of the valve seat 108 is exempt from a counter-force, generated by the static friction of the radial seals. If the state in FIG. 4 is reached, then the pilot piston 110 closes a second valve seat 114, as a result of which the working ports 20, 24 are separated from each other. Consequently, the compressed air can no longer reach the working output 24, and in the event of an external connection, according to FIG. 1, the compressed air can no longer reach the control input 50 either.

While the initial movement of the pilot piston during the switch-over from the drive position, according to FIG. 2, to the park position, according to FIG. 4, is supported by the action of the spring 112, this spring 112 does not impede the initial movement of the pilot piston 100 during the switch-over from the park position, according to FIG. 4, to the drive position, according to FIG. 2. While the air bleed port 70 in the state, according to FIG. 4, is pressurized, a pressure also builds up in the working space 104 and, in the event of an external connection according to FIG. 1, at the control input 50 of the pilot valve device 22. At this point the force of the spring 98 and the static friction of the O-rings 88, 90, 92 have to be overcome, but not the force of the spring 112. This force is not a factor until the valve seat 108 closes, but then it is just the sliding friction of the O-rings 88, 90, 92 that acts against the movement of the pilot piston 100. As a result, the pilot valve device 22 can be moved reliably into its drive position, according to FIG. 2.

For the switch-over from the drive position, according to FIG. 2, into the park position, according to FIG. 4, it is especially useful if the initial movement of the pilot piston 100 is supported in that the air bleed output 70 is pressurized. In the circuit according to FIG. 1, this process is carried out by energizing the pilot and air bleed solenoid valve 72. If the valve seat piston 110 is then disposed in the valve housing 84 in such a way that its surface 124, facing away from the valve seat 108, thus facing the spring 112, is subjected to the action of the pressure supplied via the air bleed port 70, then the resulting force facilitates in a useful way the movement of the pilot piston in the direction of the second valve seat 114.

Figure 5:
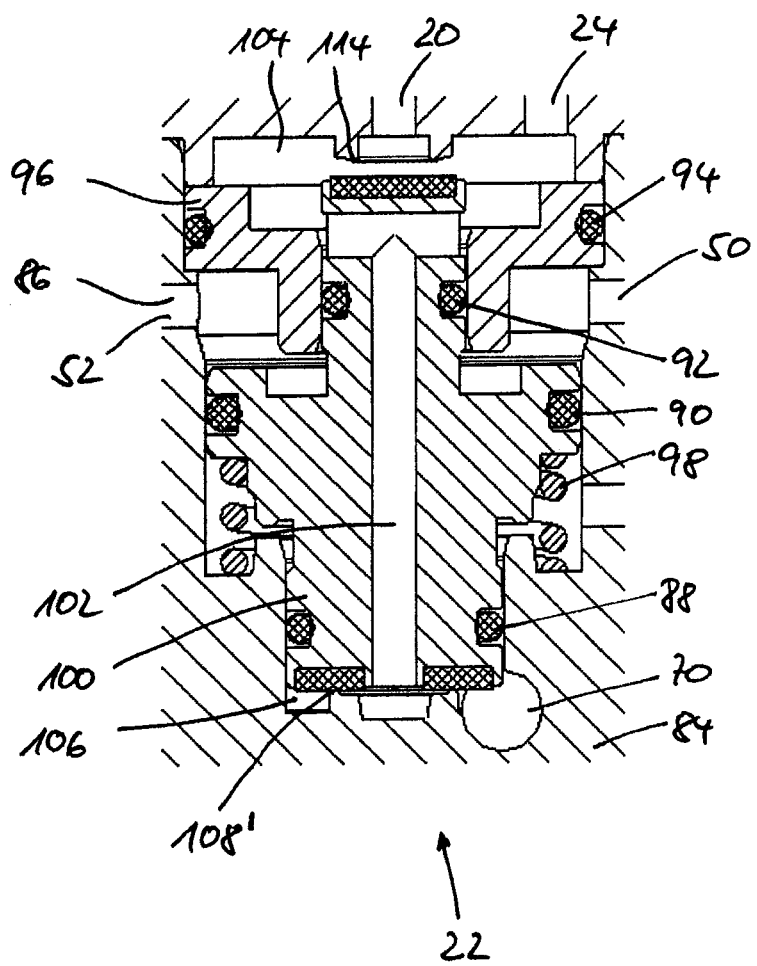
FIG. 5 is a pilot valve device with a stationary valve seat in a drive position.
Figure 6:
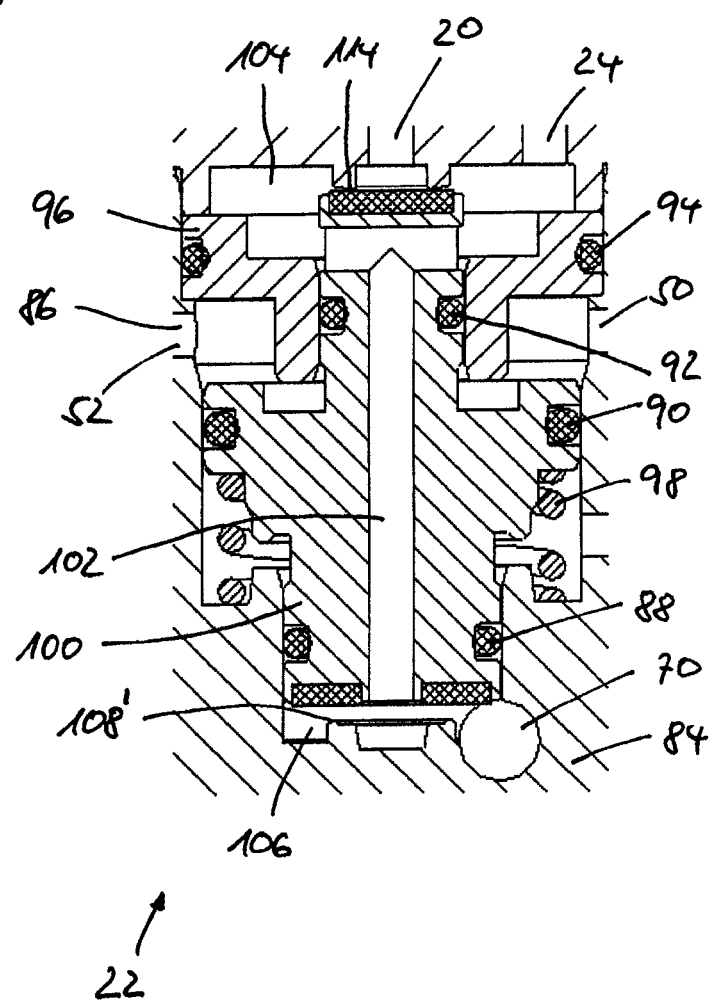
FIG. 6 is a pilot valve device with a stationary valve seat in a park position.

FIG. 5 shows a pilot valve device 22 with a stationary valve seat 108' in a drive position. In contrast to the embodiment according to FIGS. 2 to 4, the pilot valve device 22, according to FIG. 5, does not have a displaceable valve seat piston. Rather the valve seat 108' is stationary. Nevertheless, the switch-over from the drive position, shown in FIG. 5, to the park position, shown in FIG. 6, can be assisted in that the air bleed port 70 is pressurized, while simultaneously the working port 20 is air bled.

The pilot valve devices, described in conjunction with the FIGS. 2 to 6, are guided and sealed by three O-rings 88, 90, 92. The active surfaces of the pilot piston 100 are configured in such a manner that a switch-over from the park position into the drive position occurs when the pilot and air bleed solenoid valve device 72, according to FIG. 1, is energized. As soon as the pilot valve device 22 is then changed over into the drive position, the pilot and air bleed valve device 72 can be moved into its de-energized state without having an impact on the switched state of the pilot valve device 22.

Figure 7:
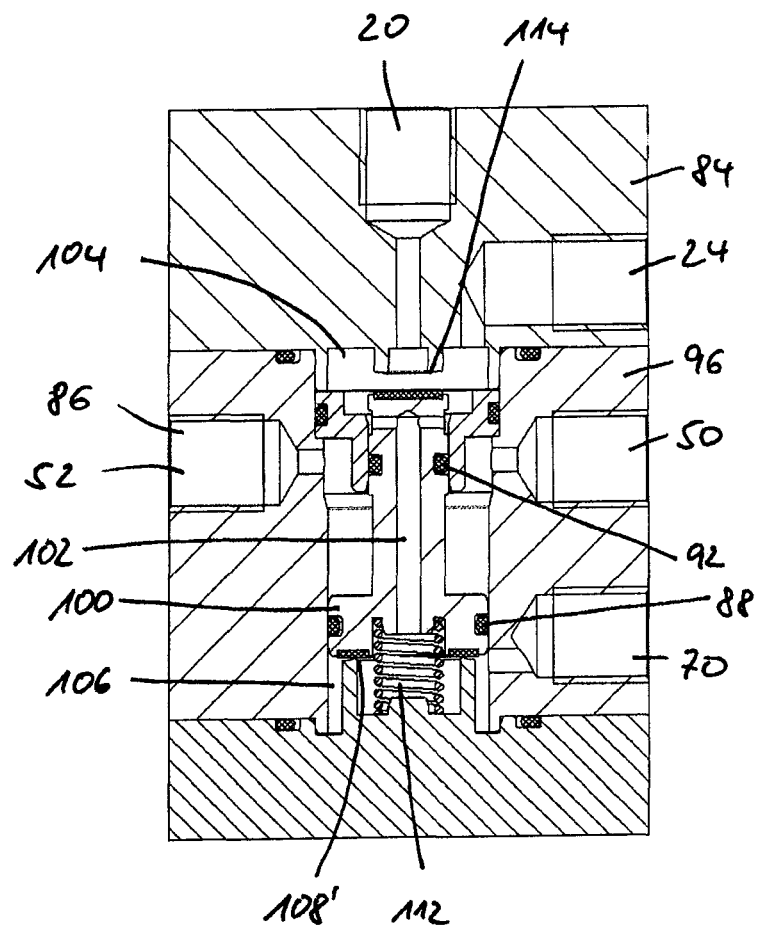
FIG. 7 is a pilot valve device with a pilot piston, exhibiting two radial seals, in a drive position.
Figure 8:
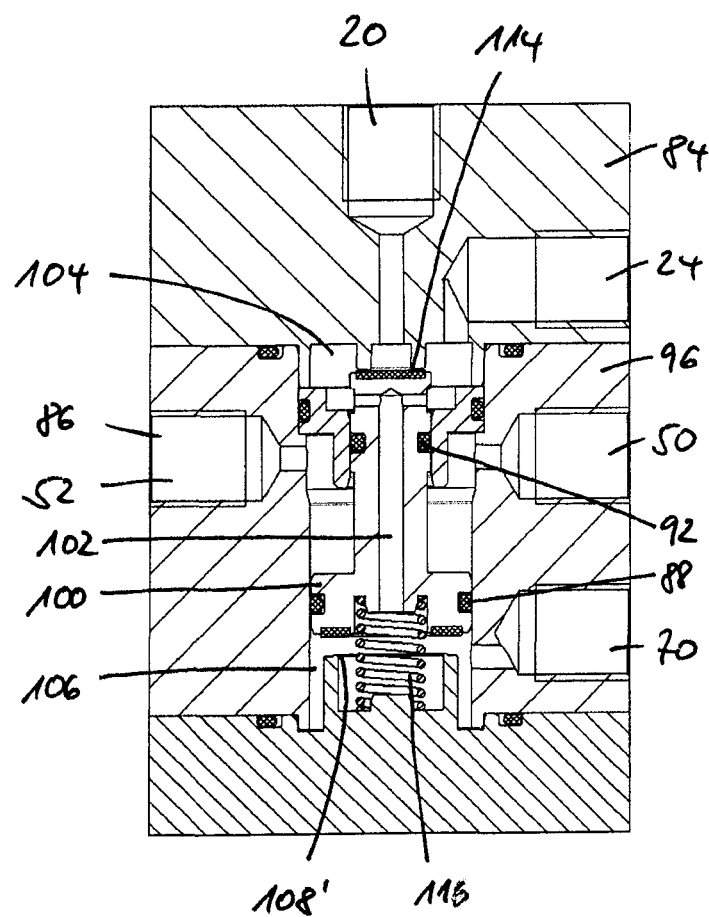
FIG. 8 is a pilot valve device with a pilot piston, exhibiting two radial seals, in a park position.

FIG. 7 shows a pilot valve device 22 with a pilot piston 100, exhibiting two radial seals 88, 92, in a drive position. FIG. 8 shows the pilot valve device 22 with a pilot piston 100, exhibiting two radial seals 88, 92, in a park position. The herein illustrated pilot valve device 22 has a pilot piston 100, which is guided by only two radial seals—that is, the O-rings 88, 92. Taking into consideration the force of the spring 116, the conditions of the active surfaces are such that, when the pilot and air bleed solenoid valve device 72 is energized, the pilot valve device 22 is not moved from its park position, shown in FIG. 8, into its drive position, shown in FIG. 7. However, this switch-over can still be induced by changing the periphery of the pilot valve device 22, a feature that is explained in conjunction with the following FIGS. 9 to 11. The pilot valve device 22, according to FIGS. 7 and 8, has a stationary valve seat 108'. However, it can also be provided with a displaceable valve seat.

Figure 9:
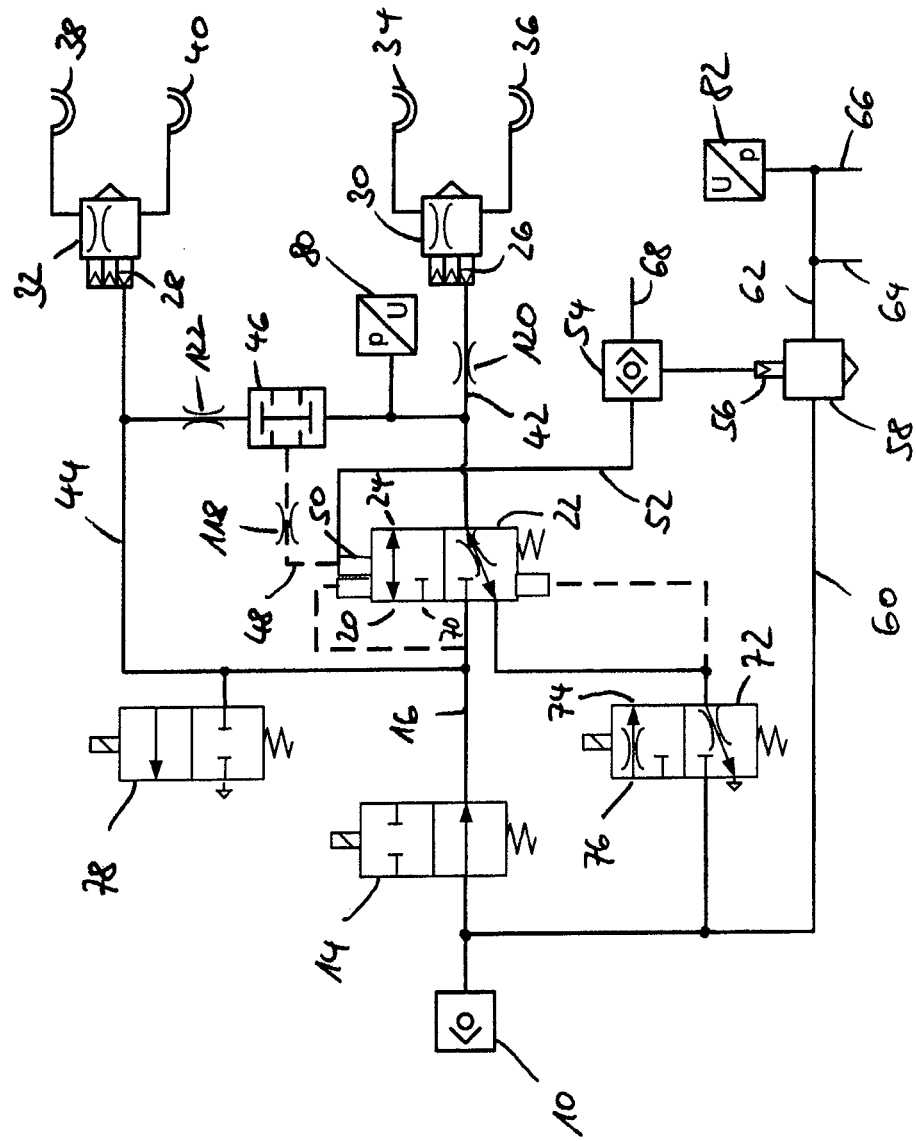
FIG. 9 is a schematic drawing of an electrically operable parking brake system in a first state.
Figure 10:
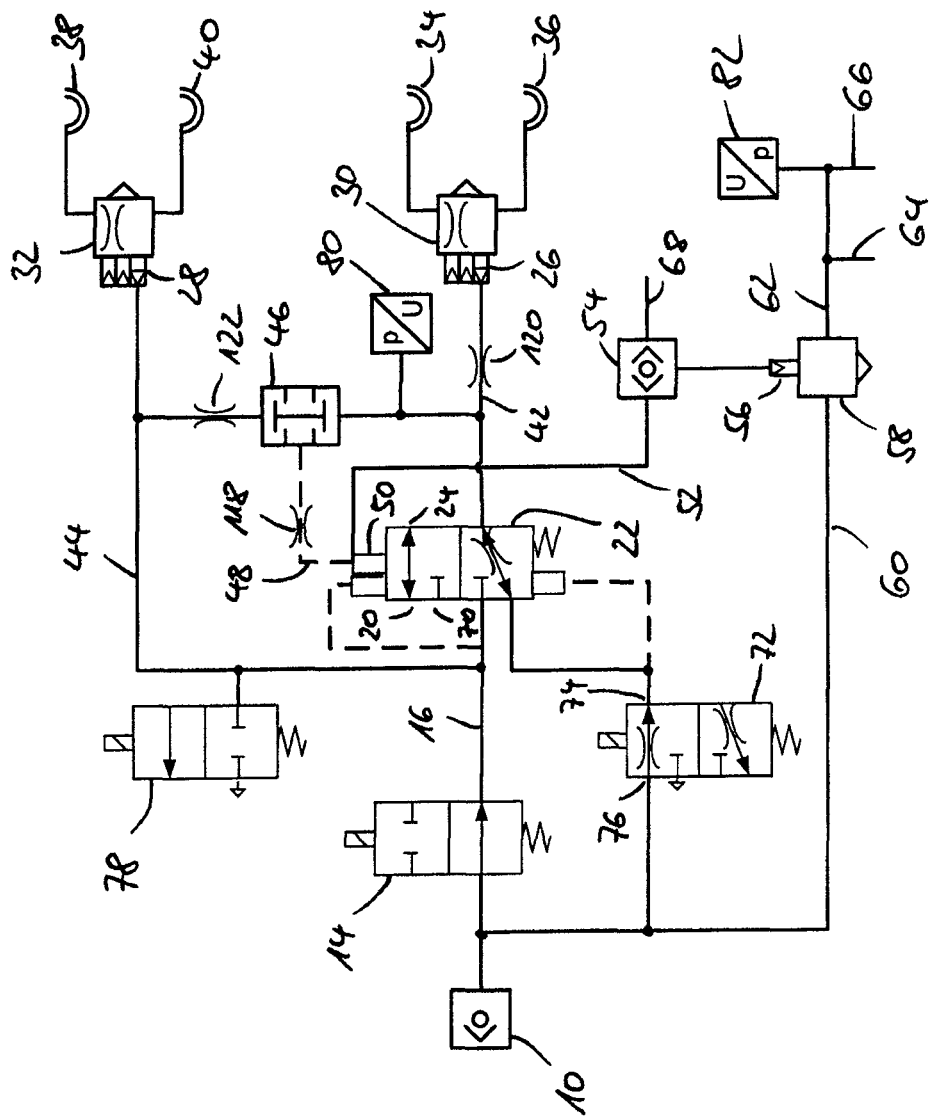
FIG. 10 is a schematic drawing of an electrically operable parking brake system in a second state.
Figure 11:
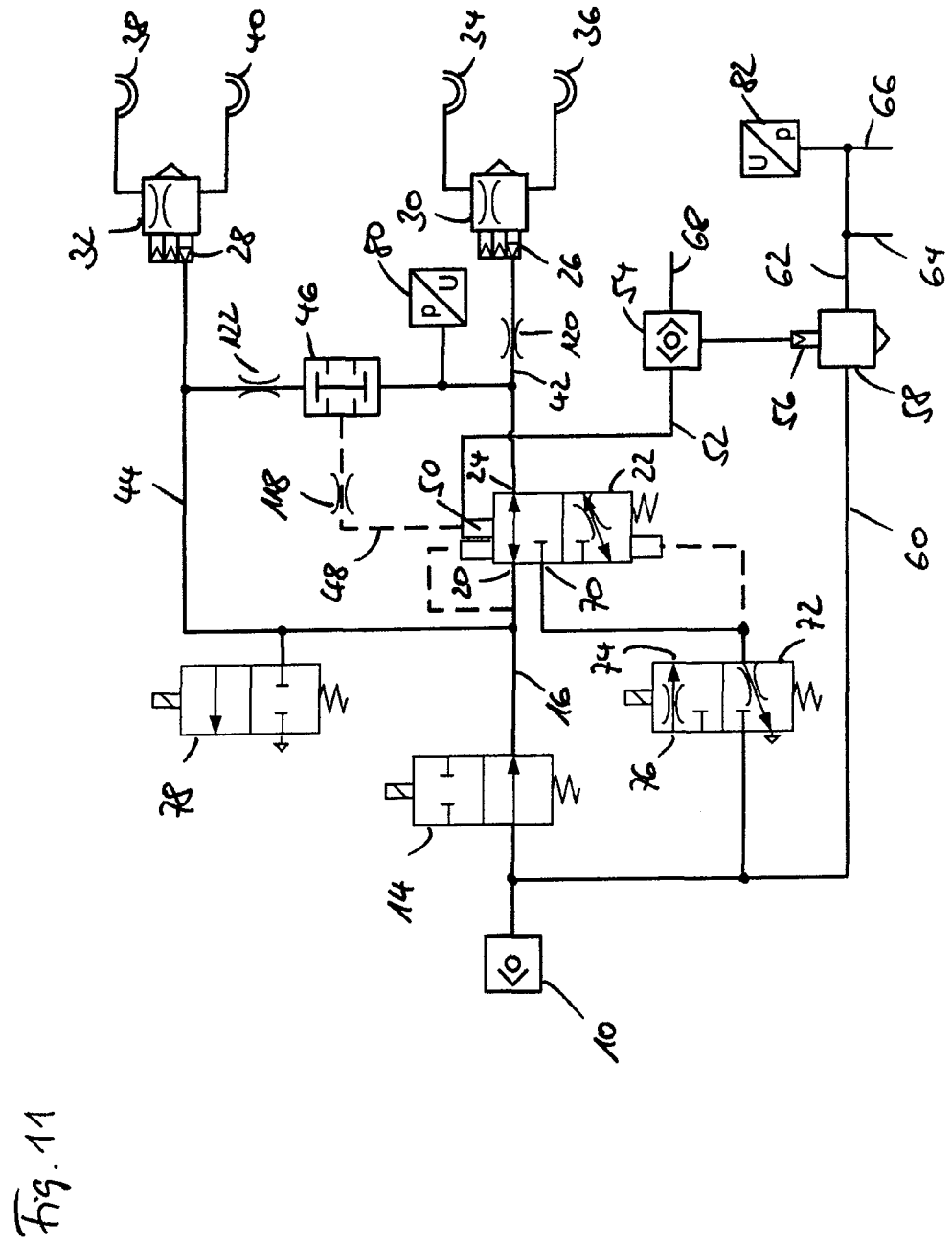
FIG. 11 is a schematic drawing of an electrically operable parking brake system in a third state.

FIGS. 9 to 11 are schematic drawings of an electrically operable parking brake system in three different switched states. The major distinction between the system, depicted in FIGS. 9 to 11, and the system, depicted in FIG. 1, lies essentially in the fact that throttles 118, 120, 122 are provided in the control line 48, the trailer control line branch 42, and the input port of the select low valve 46 that leads to the trailer control line branch 44. In addition, the pilot valve device 22 has a throttle in the air bleed path of its pilot piston. If at this point a switch-over from the state, which corresponds to the park position and is shown in FIG. 9, into the state, which corresponds to the drive position and is shown in FIG. 11, occurs, then the pilot and air bleed solenoid valve device 72 is first changed over, as shown in FIG. 10. As mentioned in conjunction with FIGS. 7 and 8, the pilot valve device 22 can be configured such that the resulting pressure conditions do not result in a changeover of the pilot valve device 22. If, however, after a certain energizing period of the pilot and air bleed solenoid valve 72, a certain pressure level in the control line 48 has built up, then the pilot valve device 22 can be changed over in that by de-energizing the pilot and air bleed solenoid valve 72 it is moved into its state, in which it bleeds the air bleed port 70 of the pilot valve device 22. Owing to the throttle 118, the pressure at the air bleed port 70 can be reduced faster than at the control input 48. In this way it is possible for the force, acting on the pilot piston 100 by way of the control input 50, to move the pilot piston 100 against the spring force and against the reduced pressure at the air bleed port 70, so that in the final end it occupies the switched state shown in FIG. 11. Then in this switched state the compressed air can flow again through the supply line section 16 and the working ports 20, 24 of the pilot valve device 22 to the control input 50 of the pilot valve device 22 so that the drive mode is stable and is also maintained even in the event of a power failure.

TABLE OF REFERENCE NUMERALS 10 check valve
12 filter unit
14 supply solenoid valve
16 supply line section
18 throttle
20 first working port
22 pilot valve device
24 second working port
26 control input
28 control input
30 trailer control module
32 trailer control module
34 supply port
36 pilot port
38 supply port
40 pilot port
42 trailer control line branch
44 trailer control line branch
46 select low valve
48 control line
50 control input
52 relay control line
54 shuttle valve
56 relay control input
58 relay valve
60 relay supply line
62 relay supply line
64 line branch
66 line branch
68 service brake line
70 air bleed port
72 pilot and air bleed valve device
74 port
76 port
78 air bleed solenoid valve
80 pressure sensor
82 pressure sensor
84 valve housing
86 relay port 88 O-ring
90 O-ring
92 O-ring
94 O-ring
96 sleeve
98 spring
100 pilot piston
102 borehole
104 working space
106 air bleed space
108 first valve seat
108' first valve seat
110 valve seat piston
112 spring
114 second valve seat
116 spring
118 throttle
120 throttle
122 throttle
124 surface The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A valve device for a pneumatic brake system of a commercial vehicle, comprising:
    a valve housing;
    a pilot piston, which is axially displaceably guided in the valve housing by way of radial seals;
    a first working port;
    a second working port;
    a pneumatic control input; and
    an air bleed port,
    wherein the valve device is operably configured such that, in a first switched state of the valve device, control input pressurization causes the pilot piston to be held in a first end position, at which the pilot piston rests against a first valve seat, against a spring force, so that the first valve seat seals the second working port from the air bleed port, and causing the pilot piston to be lifted from a second valve seat, so that the first working port is connected to the second working port;
    wherein the valve device is further operably configured such that, in a second switched state of the valve device, bleeding of the pneumatic control input causes the pilot piston to be lifted from the first valve seat by the spring force, so that the first valve seat connects the second working port to the air bleed port, and causes the pilot piston to be held in a second end position, at which the pilot piston rests against the second valve seat, with the spring force, so that the second valve seat seals the first working port from the second working port; and
    wherein the first valve seat is displaceable in the direction of movement of the pilot piston so that the first valve seat and the pilot piston resting against the first valve seat are synchronously axially displaceable when the second working port is sealed from the air bleed port.

2. The valve device according to claim 1, wherein the first valve seat is subjected to a spring force action, so that the first valve seat follows the movement of the pilot piston when the pilot piston leaves the first end position.

3. The valve device according to claim 1, wherein the displaceability of the first valve seat is limited such that the first valve seat cannot follow the pilot piston as far as into the second end position.

4. The valve device according to claim 2, wherein the displaceability of the first valve seat is limited such that the first valve seat cannot follow the pilot piston as far as into the second end position.

5. The valve device according to claim 1, wherein an active surface is part of a valve seat piston bearing the first valve seat, wherein the active surface faces away from the first valve seat, wherein the active surface is arranged in an air bleed space, and wherein a pressure level of the air bleed space is identical to a pressure level of the air bleed port in at least the first switched state of the valve device.

6. The valve device according to claim 2, wherein an active surface is part of a valve seat piston bearing the first valve seat, wherein the active surface faces away from the first valve seat, wherein the active surface is arranged in an air bleed space, and wherein a pressure level of the air bleed space is identical to a pressure level of the air bleed port at least the first switched state of the valve device.

7. The valve device according to claim 4, wherein an active surface is part of a valve seat piston bearing the first valve seat, wherein the active surface faces away from the first valve seat, wherein the active surface is arranged in an air bleed space, and wherein a pressure level of the air bleed space is identical to a pressure level of the air bleed port in at least the first switched state of the valve device.

8. An electrically operable parking brake system for a pneumatic brake system of a commercial vehicle, the electrically operable parking brake system comprising:
    a pilot valve comprising:
        a valve housing, a pilot piston, which is axially displaceably guided in the valve housing by way of radial seals, a first working port, a second working port, a pneumatic control input, and an air bleed port, wherein the valve device is operably configured such that, in a first switched state of the valve device, control input pressurization causes the pilot piston to be held in a first end position, at which the pilot piston rests against a first valve seat, against a spring force, so that the first valve seat seals the second working port from the air bleed port, and causing the pilot piston to be lifted from a second valve seat, so that the first working port is connected to the second working port, wherein the valve device is further operably configured such that, in a second switched state of the valve device, bleeding of the pneumatic control input causes the pilot piston to be lifted from the first valve seat by the spring force, so that the first valve seat connects the second working port to the air bleed port, and causes the pilot piston to be held in a second end position, at which the pilot piston rests against the second valve seat, with the spring force, so that the second valve seat seals the first working port from the second working port; and
    wherein the first valve seat is displaceable in the direction of movement of the pilot piston so that the first valve seat and the pilot piston resting against the first valve seat are synchronously axially displaceable when the second working port is sealed from the air bleed port;
    wherein the first working port is selectively supplyable with compressed air from a compressed air source or is bleedable;
    wherein the second working port is coupleable with a compressed air consumer;

wherein the pneumatic control input is coupleable at least indirectly with a control input of a relay valve for a parking brake; and wherein the air bleed port is coupleable with a pilot and air bleed valve device.

9. The electrically operable parking brake system according to claim 8, wherein the pilot and air bleed valve device is operatively configured for pressurizing the air bleed port.

10. A method of operating an electrically operable parking brake system for a pneumatic brake system of a commercial vehicle, the electrically operable parking brake system comprising:

a pilot valve comprising:

a valve housing, a pilot piston, which is axially displaceably guided in the valve housing by way of radial seals, a first working port, a second working port, a pneumatic control input, and an air bleed port, wherein the valve device is operably configured such that, in a first switched state of the valve device, control input pressurization causes the pilot piston to be held in a first end position, at which the pilot piston rests against a first valve seat, against a spring force, so that the first valve seat seals the second working port from the air bleed port, and causing the pilot piston to be lifted from a second valve seat, so that the first working port is connected to the second working port, wherein the valve device is further operably configured such that, in a second switched state of the valve device, bleeding of the pneumatic control input causes the pilot piston to be lifted from the first valve seat by the spring force, so that the first valve seat connects the second working port to the air bleed port, and causes the pilot piston to be held in a second end position, at which the pilot piston rests against the second valve seat, with the spring force, so that the second valve seat seals the first working port from the second working port, wherein the first valve seat is displaceable in the direction of movement of the pilot piston so that the first valve seat and the pistol piston resting against the first valve seat are synchronously axially displaceable when the second working port is sealed from the air bleed port, the method comprising the acts of:

moving the electrically operable parking brake system from a drive mode into a park mode; wherein the moving act occurs by pressurizing the air bleed port by a pilot and air bleed valve device while bleeding the pneumatic control input.

\* \* \* \* \*